UNITED STATES PATENT OFFICE.

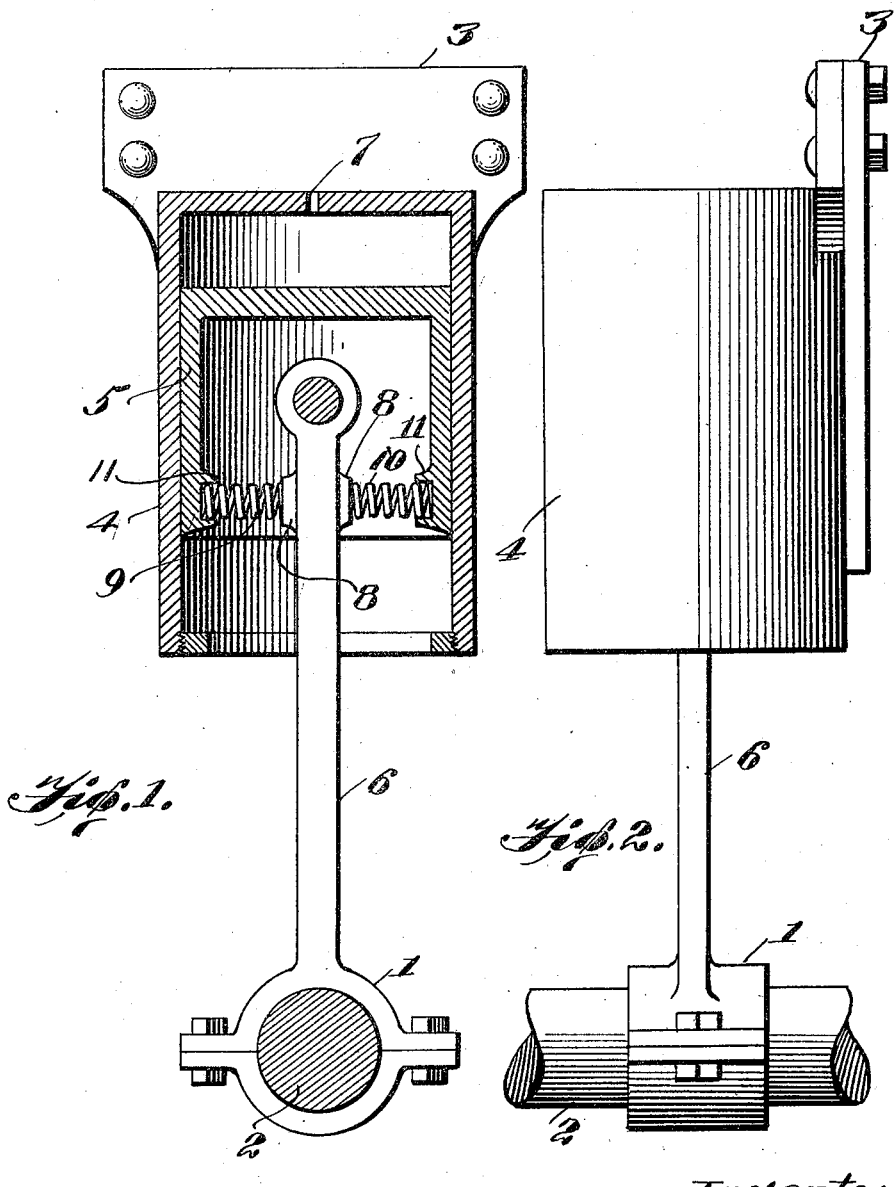

GEORGE M. BICKNELL, OF DETROIT, MICHIGAN, AND HUGH H. C. WEED, OF ST. LOUIS, MISSOURI, ASSIGNORS TO THE CARTER CARBURETER COMPANY, OF ST. LOUIS, MISSOURI, A CORPORATION OF MISSOURI.

FLOATING BEARING.

1,300,558.  Specification of Letters Patent.  Patented Apr. 15, 1919.

Application filed July 15, 1918. Serial No. 245,012.

*To all whom it may concern:*

Be it known that we, GEORGE M. BICKNELL and HUGH H. C. WEED, citizens of the United States, and residing at Detroit, in the county of Wayne, Michigan, and at St. Louis, in the county of St. Louis, Missouri, respectively, have invented certain new and useful Improvements in Floating Bearings, of which the following is a specification.

This invention relates to attachments for bearings adapted for application to rotating shafts, and more particularly to shafts which are subjected to high speed rotation. The primary object of the invention is the prevention of the whipping of shafts.

The generally accepted idea of the so-called whipping is the tendency of high speed shafting to travel, in response to centrifugal force, in a circle larger than the diameter of the shaft. This circular travel is in addition to the rotation of the shaft under applied power. The shafts are ordinarily held in fixed bearings, generally at least two in number, and the portions of the shaft which are subjected to the whipping action are located between the fixed bearings. The circle of travel of the whipping portions would manifestly be around a center which is the center of the shaft when it is at rest. It will be very readily understood that the whipping action is exceedingly destructive to the fixed bearings and to the shaft itself.

As before stated, a whipping shaft travels in a circle larger than its own diameter. Our conception is that any discouragement of the tendency of the shaft to travel in a true circle, by destroying or retarding its continuity of movement, or impulse in a fixed circular direction, will tend to cause the shaft to more nearly assume its normal straight alinement.

The invention is especially adapted for automobile shafting but it is to be clearly understood that it may be advantageously used on any high speed shafts. In automobile drive shafts a very large percentage of the destructive wear on universal joints is occasioned by shaft whipping. This wear has caused the adoption of heavier drive shafts, of abnormal diameter, which manifestly do not whip to so great an extent, because less resilient, but has occasioned a very material increase in cost of production. These heavier shafts are also objectionable in that they add to the burden of the universal joint. With the use of my invention, a long drive shaft of normal diameter will show a smaller degree of whipping tendency, and consequently cause less wear upon the bearings, than will a shaft of the same length and of abnormally large diameter.

We have observed that the whipping action is better retarded by opposing unequal resistance to the tendency of the shaft to swing in a circle. A fixed resistance of the tendency to travel to the left, for instance, should be met by either a greater or less resistance to travel to the right. Moreover, it is obvious that, in order for the shaft to travel in a circular path, the whipping portion must move upwardly and downwardly, at some point in the circle. This resistance may be applied as desired, but it is to be noted that, if equal resistance is moderately applied to movement on all directions, the whipping action will not be entirely eliminated.

Our invention therefore, by providing unequal resistance to shaft movement in different directions, renders a true circular or "whipping" movements impossible, offering at the same time no resistance to the rotative movement within the bearings.

In the accompanying drawings forming a part of this specification, we have illustrated a preferred embodiment of our invention, and have chosen to illustrate the invention applied to the drive shaft of an automobile.

In the drawings—

Figure 1 is a sectional plan view of the device applied to a shaft; and

Fig. 2 is a side elevation of Fig. 1.

The device preferably comprises a split bearing 1, surrounding the shaft 2, the shaft of course being freely rotatable within the bearing.

Fixed to any convenient portion of the automobile, such as a cross-member, is a bracket 3, adapted to support a cylinder 4. Within said cylinder is reciprocably mounted a hollow piston 5 adapted for actuation by a shaft 6 which is integrally or otherwise secured to the bearing 1. A relief port 7 is provided at some point in the cylinder beyond the limit of stroke of the piston. It will be noted that this construction specifies a dash-pot.

The shaft 6, near its point of connection to the piston 5, is provided upon each side with a cup-shaped projection 8, adapted to receive compression springs 9 and 10, the other ends of said springs being fitted into similar cup-shaped projections 11—11 mounted upon the interior periphery of the piston 5.

From the above it will be noted that we have devised means for resisting bodily movement of the bearing surrounding the shaft. In the rotation of the shaft 2, any whipping tendency would initiate a movement of the bearing. But vertical movement thereof in any direction is resisted by the dash-pot comprised by the cylinder 4, the piston 5, and the relief port 7, in a manner which it is unnecessary to specifically explain. Any lateral movement of the bearing however, causes the shaft 6 to move to the left, which compresses the spring 9, or to the right, compressing the spring 10. The springs 9 and 10 are of unequal tensile strength, and hence an unequal resistance is imparted to lateral movement of the bearing in opposite directions.

It is obvious that in actual practice of the invention, lubricating devices, such as oil cups, should be applied to all points where there is frictional contact. Since these devices form no part of my invention, they are not shown in all instances where they would be necessary.

Various modifications of the invention may be suggested to those skilled in the art to which the invention appertains, but we desire to secure by Letters Patent all such embodiments thereof as fall fairly within the scope of the appended claims.

It is obvious that equally good results might be accomplished by mounting the dash-pot laterally of the bearing instead of vertically thereof. In this position the dash-pot would affect the lateral movements of the bearing and the springs would govern the vertical movements thereof. The claims are to be construed accordingly.

What we claim is:—

1. A device of the character described comprising, in combination with a rotatable shaft, a floatable bearing engaging the shaft, and means interposing a pneumatically-cushioned resistance to flotation of said bearing.

2. A device of the character described comprising, in combination with a rotatable shaft, a floatable bearing engaging the shaft, means interposing a pneumatically-cushioned resistance to flotation of said bearing, and means for resisting lateral movement of said bearing.

3. A device of the character described comprising, in combination with a rotatable shaft, a floatable bearing engaging the shaft, means interposing a pneumatically-cushioned resistance to flotation of said bearing, and means for unequally resisting lateral movement of said bearing.

4. A device of the character described comprising, in combination with a rotatable shaft, a floatable bearing engaging the shaft, and a dash-pot connected to the bearing and adapted to present cushioning resistance to movement thereof, and means connected to the bearing adapted to unequally resist lateral movement thereof in opposite directions.

In testimony whereof we affix our signatures.

GEORGE M. BICKNELL.
HUGH H. C. WEED.